United States Patent [19]

Gee

[11] 4,365,984
[45] Dec. 28, 1982

[54] MINERAL WOOL AND PROCESS FOR PRODUCING SAME

[75] Inventor: Kenneth H. Gee, Bethlehem, Pa.

[73] Assignee: Bethlehem Steel Corporation, Bethlehem, Pa.

[21] Appl. No.: 362,210

[22] Filed: Mar. 26, 1982

Related U.S. Application Data

[63] Continuation-in-part of Ser. No. 228,420, Jan. 23, 1981, abandoned.

[51] Int. Cl.³ .......................................... C03B 37/01
[52] U.S. Cl. .............................................. 65/2; 65/5; 65/134; 110/264; 110/266; 501/36
[58] Field of Search .............. 65/2, 19, 5, 6, 7, 8, 65/134; 110/264, 266; 106/50

[56] References Cited

U.S. PATENT DOCUMENTS

| | | | |
|---|---|---|---|
| 2,193,982 | 3/1940 | Ramjemer | 106/36.3 |
| 2,217,808 | 10/1940 | Nye | 65/19 |
| 2,707,444 | 5/1955 | Van Loon | 110/28 |
| 2,745,557 | 5/1956 | Oster | 263/53 |
| 2,917,011 | 12/1959 | Körner | 110/264 |
| 3,131,053 | 4/1964 | Grebe et al. | 65/19 X |
| 3,642,445 | 2/1972 | Muter | 23/2 |

Primary Examiner—Robert L. Lindsay, Jr.
Attorney, Agent, or Firm—Joseph J. O'Keefe; Charles A. Wilkinson; John S. Simitz

[57] ABSTRACT

A process for producing mineral wool having a chemical composition comprised of between about 50 and 70 weight percent silica plus alumina, about 20 and 35 weight percent lime plug magnesia and about 5 and 15 weight percent iron oxides is described.

The process includes feeding a first particulate waste material having a particle size of 100 weight percent −200 mesh and containing organic combustibles having heating values of about 10 mega J per kilogram of slag and inorganic non-combustibles, a second particulate waste material having a particle size of 100 weight percent −200 mesh and containing fluxstone, and preheated air at a velocity of between about 30 meters to 60 meters per second at a temperature of about 500° C. into a high temperature cyclone-like furnace. The combustibles are substantially instantaneously burned and the non-combustibles and the fluxstone are melted and reacted to form a molten slag which can be fiberized into mineral wool.

10 Claims, 1 Drawing Figure

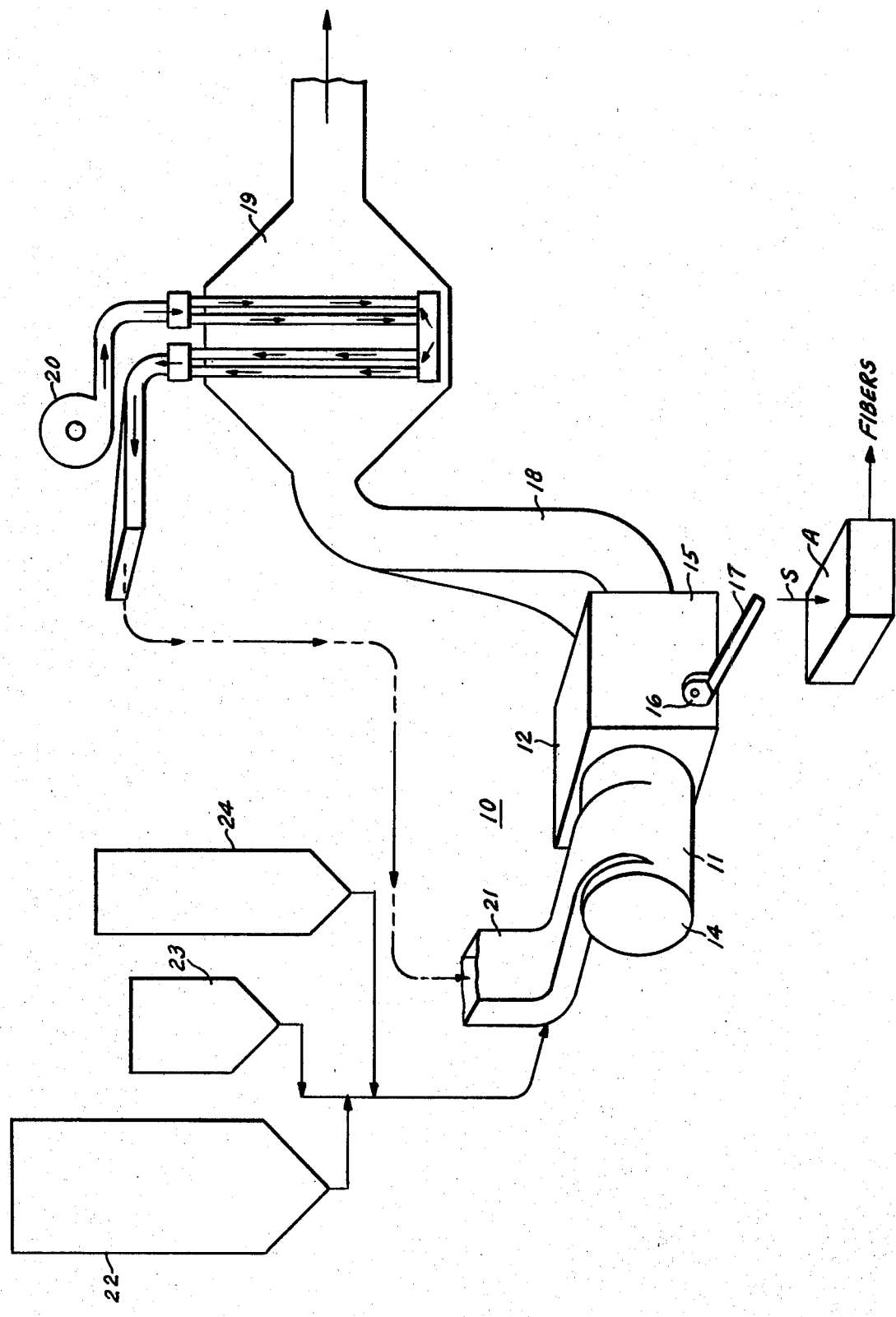

MINERAL WOOL AND PROCESS FOR PRODUCING SAME

CROSS-REFERENCES OF THE INVENTION

This application is a continuation-in-part application of my application Ser. No. 06/228,420 filed Jan. 23, 1981 entitled "Mineral Wool and Process for Producing Same", now abandoned.

BACKGROUND OF THE INVENTION

This invention is directed to a process for producing mineral wool from molten slag which has been formed in a cyclone-like furnace. In the process, a first particulate material containing combustibles having heat values and non-combustibles are fed with a second particulate material containing fluxstone and preheated air into a a cyclone-like furnace wherein the combustibles are substantially instantaneously burned and the non-combustibles and fluxstone are melted and reacted to form a molten slag suitable for fiberizing into mineral wool. More particularly, the invention is directed to a process in which particulate waste coal products containing organic combustibles having heat values and inorganic non-combustibles and lime waste products containing fluxstone are fed with preheated air into a high temperature furnace wherein the combustibles are substantially instantaneously burned and the non-combustibles and fluxstone are melted and reacted to form a molten slag of a desired composition, which slag is fiberized into mineral wool.

Mineral wool is an inorganic amorphous fibrous solid silicate material containing varying percentages of metallic oxides, particularly of silicon, aluminum, iron, magnesium and calcium with incidental percentages of manganese, titanium, sulfur and the like. Mineral wool is a generic term which includes rock wool which is made from rocks and/or slags, slag wool which is made from slags produced in certain processes, for example iron and steel making, and glass wool. Rock wool and slag wool usually have a silica plus alumina content which is between about 45 to 55 weight percent and typically contain 32 to 45 weight percent silica whereas glass wool has a silica plus alumina content of at least about 70 weight percent, and may be as much as 80 weight percent, and a silica content of 55 to 75 weight percent. Mineral wools may be used for insulation against heat and cold and for sound absorption.

Rock wools are made from molten slags produced in a suitable furnace wherein naturally occurring rocks and/or slags having the requisite chemical composition are melted by means of burning coke or by electrical energy. In the cupola or vertical shaft furnace process, naturally occurring materials, for example argillaceous limestone, calcareous shale and mixtures of such materials, together with coke constitute the charge delivered into the cupola or vertical shaft furnace. The coke burns and melts the rocks or minerals in the burden producing a liquid slag having the required composition. Cupolas, which are used to produce the liquid slags, have a low unit capital cost, are thermally efficient and can be started and stopped relatively quickly. However, the operation of the cupola can be erratic. Although the composition of the slag can be regulated by varying the composition of the burden, the effects of any such variations are not noticeable for one hour or more. As a result it is possible that large quantities of off-composition liquid slag can be produced. It is also possible to increase or decrease the temperature in the cupola by increasing or decreasing the proportion of coke in the burden or by varying the temperature of the air introduced into the bottom of the furnace if preheated air is used to aid combustion. However, the effects of such changes are not realized immediately but occur over a considerable time span, for example at least one hour.

Mineral wools have also been prepared from waste products, such as fly ash produced during combustion of pulverized coal in the boilers of power generating plants and from waste materials produced during the processing of natural rocks and minerals. One such process, described in U.S. Pat. No. 2,020,403 issued in 1935 to Isaiah B. Engle entitled "Process for Producing Mineral Fiber", is directed to a process for producing mineral fiber in which waste limestone fines and waste clay particles are mixed and extruded into briquettes which are charged into a cupola-like furnace and from which by the use of a suitable fuel a molten slag is produced which may be processed into mineral fiber. Various fuels may be used as a part of the briquettes or may be charged as a separate material between the briquettes. The preferred fuel is a very fine waste coal known as anthracite culm or fine waste coke known as coke breeze. Other fuels, such as oil, coal or gas, may also be used in the process. The mixture is ignited and air is blown upwardly through the burden. The briquettes are readily and quickly heated to a high temperature causing the articles to melt and form a molten slag. The slag flows downwardly in the furnace and is discharged through a port formed near the bottom of a wall of the furnace. The thus discharged molten slag is propelled through the air at relatively high speed to form thread-like fibers which are collected in the form of wool. The fibers are processed into batts or other forms which are commercially usable. During fiberization, a portion of the slag forms in the shape of small spherical particles which are referred to as shot. The shot is collected and recycled in the process. The mineral fiber thus produced has a composition of 35 to 45 weight percent silica; 10 to 20 weight percent alumina; 5 to 8 weight percent ferric oxide; 15 to 25 weight percent lime and 8 to 25 weight percent magnesia.

The process described above is subject to the problems of producing molten slags in cupola furnaces as mentioned above. Additionally, the waste limestone fines utilized in the process have compositions which can vary widely dependent upon the location from which they were quarried. As a result, the compositions of the molten slags produced from these waste products are not uniform. To produce molten slags of essentially similar compositions, it is necessary to carefully select the waste material used in the process.

Molten slags of more uniform composition than are prepared as described above can be prepared by melting rocks or minerals in electric furnaces. Electric furnaces are amenable to close control of the melting process. Maintenance or adjustment of the temperature and composition of the liquid slag is more easily made and the results are more quickly realized than in cupola melting. Electric energy is, however, expensive and the original capital cost of an electric furnace and attendant equipment is relatively high. Therefore, electric furnaces are used where electric energy is relatively cheap when compared to the use of coke as a fuel.

The production of mineral wool directly from molten slags formed in ironmaking furnaces, steelmaking furnaces, non-ferrous melting furnaces and the like has been tried, but has not been commercially successful. Such slags generally are not of the required composition and additions of other materials are needed to obtain the required composition. The iron oxide content of the slags may be too high or too low for the type of mineral wool desired or the slag may have a high calcium oxide content whereby large additions of silica may be required to attain the desired chemistry.

There is, therefore, a need for a relatively inexpensive continuous process which is susceptible to close operational control wherein particulate combustibles are substantially instantaneously burned and particulate non-combustibles of a desired composition and particulate fluxstone are melted and reacted to form molten slags of a desired composition, which slags can be fiberized into mineral wool.

It is an object of this invention to provide a relatively low cost continuous process for producing molten slags of a desired composition which can be fiberized into mineral wool, which process is amenable to close operational control and has substantially instantaneous response to compositional and temperature controls.

It is another object of this invention to provide a process for producing molten slags of a desired composition and which are suitable for fiberizing into mineral wool wherein mixtures of a particulate material, such as waste coal tailings containing organic combustibles and inorganic non-combustibles and a particulate material, such as waste lime containing fluxstone and preheated combustion air are continuously charged into a high temperature furnace wherein the combustibles are substantially instantaneously burned at relatively high temperatures and the non-combustibles and fluxstone are melted and reacted to form molten slags which have the requisite composition, temperature and viscosity suitable to be fiberized into mineral wool.

SUMMARY OF THE INVENTION

According to this invention, there is provided a novel process for producing mineral wool from molten slags having a desired composition. The molten slag can be fiberized into mineral wool characterized by having improved resistance to hydration when compared to mineral wool produced in cupolas and/or from iron-making and steelmaking slags. Greater resistance to hydration is possible because of the higher total amount of silica plus alumina than is attainable in conventional rock wool processes.

In the process a particulate material containing heating values in the form of organic combustibles and inorganic non-combustibles is fed together with a particulate material containing fluxstone and preheated air into a high temperature cyclone-type furnace. The combustibles are substantially instantaneously burned. The non-combustibles and the fluxstone melt and react with each other to form a molten slag of a desired composition. The molten slag is discharged through the bottom of the furnace. The molten slag is fiberized by any one of several known processes into mineral wool having a silica plus alumina content of between about 50 to 70 weight percent, a lime plus magnesia content of about 20 to 35 weight percent and an iron oxides content of about 5 to 15 weight percent. The ratio of silica to alumina is between about 3:1 to 1.5:1. The reduction of iron oxides to metallic iron by unburned carbonaceous particles is reduced to a minimum, if not completely eliminated.

The particulate material may be waste coal tailings from a fine coal washing circuit containing combustible coal particles having a heating value of between about 5 mega J per kilogram and 21 mega J per kilogram of material calculated on a dry basis. If the waste coal tailings do not contain sufficient heat values, for example at least about 10 mega J per kilogram of molten slag, virgin fine coal particles may be added to the tailings.

The fluxstone may be tailings from a limestone quarry or lime kiln dust or other quarry tailings containing fluxstone. The preheated air should be at a temperature of between about 430 C. and 650 C. and should be fed into the furnace at a velocity of between about 30 and 60 meters per second. The particulate materials and preheated air are burned to produce a molten slag having the proper temperature for attaining a suitable slag viscosity, for example about 20 or more poises, amenable to fiberization into mineral wool of the desired composition by any one of several known commercial processes. The mineral wool fibers thus formed have a length of suitable size and a diameter within the range of 3 and 12 microns. The exhaust gases produced in the furnace during combustion are passed to a heat exchanger wherein they are used to preheat the incoming air used for combustion in the furnace. Use of preheated air improves the efficiency and reduces the cost of the process. The mineral wool can be formed into useful commercial articles such as insulating batts.

The waste products charged into the furnace can contain up to about 80 weight percent waste coal tailings and about 20 weight percent waste lime kiln tailings. The proportions are regulated so that the heat values of the mixtures charged into the furnace are not less than 10 mega J per kilogram of molten slag produced. The composition, temperature and viscosity of the molten slag are controlled to obtain optimum fiberization of the slag and properties of the mineral wool. The molten slag can have a viscosity between about 20 and 200 poises.

Optionally, particulate virgin coal fines, may be used instead of the waste coal tailings or the virgin coal fines may be mixed with waste coal tailings to obtain the heat values required for melting and reacting the non-combustibles and fluxstone to produce the molten slag. Reverts formed during fiberization of the molten slag are collected and may be recycled to the furnace to control the temperature of the flame and indirectly the slag exiting from the furnace to prevent excessively high temperatures which can result in a "runny" or "thin" molten slag. Reverts are usually wasted, however their use in the process maximizes both the efficiency of the process and the use of any waste materials.

According to this invention, there is provided a mineral wool in which the ratio of silica to alumina is within the range of about 3:1 to 1.5:1 and the composition is comprised of a silica plus alumina content between about 50 and 70 weight percent, about 25 to 35 weight percent lime plus magnesia and about 5 to 15 weight percent iron oxides and is characterized by good resistance of hydration.

FIGURE OF THE INVENTION

The FIGURE is a diagrammatic representation of the process of the invention.

PREFERRED EMBODIMENT OF THE INVENTION

The preferred embodiment of the process of the invention includes feeding a first particulate waste material containing organic combustibles and inorganic non-combustibles and characterized by having heat values of at least about 10 mega J per kilogram of molten slag and a size consist of 100 weight percent −200 mesh and at least 70 weight percent −325 mesh, and a second particulate waste material containing fluxstone and characterized by a size consist of 100 weight percent −200 mesh and at least 30 weight percent −325 mesh and preheated combustion air into a high temperature heat furnace, i.e. a cyclone-like furnace. The heat values in the organic combustibles are released when the combustibles are substantially instantaneously burned as they are fed into the furnace. The non-combustibles and fluxstone are melted and react to form a molten slag of the desired chemical composition and viscosity. The molten slag forms on the walls of the furnace, flows downwardly to the bottom of the furnace and is discharged through a discharge port in the bottom of the furnace to fiberizing equipment whereby the slag is fiberized. During fiberization the molten slag is substantially simultaneously cooled and formed into slender, elongated fibers of a desired size. The molten slag can be fiberized by striking or disrupting a stream of freely falling molten material with high pressure air or steam. Cooling solidifies the material in fiber form. Several small streams of molten material or one stream can be treated but the use of smaller streams favors more complete fiberization. The molten slag can also be fiberized by dropping the molten material onto a spinning wheel or wheels of desired shape. The velocity of the wheel is transmitted to the molten slag which is thrown away from the surface of the wheel by centrifugal force. The molten slag thus spun is formed into fibers which generally are longer than produced by blowing air or steam at approximately right angles to a freely falling molten stream.

Particulate materials useful in the process are waste coal tailings, such as are formed during the cleaning and recovery of fine coal particles (hereinafter referred to as waste coal) in a coal preparation plant, and virgin coal fines and waste lime tailings (hereinafter referred to as waste lime) from a lime burning kiln, limestone quarry, and the like. The particulate waste materials are fed into the furnace in predetermined proportions, for example 1 kilogram of waste coal per 0.15 kilogram of waste lime.

One such process which can be used to fiberize molten slag is described in U.S. Pat. No. 2,178,871 to D. C. Drill entitled "Process for Producing Fibrous Material".

Reverts, which are small solid generally spherical particles having the same composition as the molten slag, usually are formed during fiberization. In the present invention, reverts are separated from the "wool" and are stored for future use in the process. Reverts in specified quantities are recycled to the furnace as a diluent to control the temperature of the slag in the furnace. The temperature of the slag controls fiberization and is related to the flame temperature. The temperature of the slag should be adjusted with changes in composition to maintain good fiberization.

The heat value or calorific content of the coal waste should be at least 10 mega J per kilogram and the temperature of the flame in the furnace may be between about 1500 and 1900 C. If the waste coal contains less than 10 mega J per kilogram, additives, for example virgin coal fines can be added to the waste coal to upgrade the heat values to the desired amount. Flame temperatures lower than about 1500 C. may cause the molten slag to become too viscous to be treated in the fiberizer while temperatures higher than about 1900 C. may cause the slag to be "runny" or "thin" making it virtually impossible to process the molten slag into fibers of mineral wool. The reverts are added to maintain the slag temperature in a good fiberization range and to increase product yield and decrease product waste. The preheated combustion air may have a temperature as low as about 430 C. or as high as about 650 C. when blown into the combustion section. It is preferred to use preheated air at the highest possible temperature, i.e. between about 600 to 650 C. to permit full utilization of the reverts to obtain the most efficient and economical operation of the process.

The waste coal used in the process may have an ash composition within the range shown below:

| Component | Weight Percent |
|---|---|
| Silica ($SiO_2$) | 49–62 |
| Alumina ($Al_2O_3$) | 21–27 |
| Lime (CaO) | 1–3 |
| Magnesia (MgO) | 0.5–3 |
| Iron Oxides | 2.5–19 |
| Sulfur | 0.3–4 |

The waste coals within the above ranges can have heating values ranging between about 5 mega J and 21 mega J per kilogram of molten slag produced. As noted previously, it may be necessary to add a particulate material having heating values, such as virgin coal fines, to the waste coal which has less than about 10 mega J per kilogram of molten slag of heating values to increase those values to at least about 10 mega J of molten slag produced. The waste lime may have compositions within the range shown below:

| Component | Weight Percent |
|---|---|
| Silica ($SiO_2$) | 4.0 to 17.1 |
| Alumina ($Al_2O_3$) | 1.56 to 8.8 |
| Calcium Oxide (CaO) | 39.4 to 67.3 |
| Magnesium Oxide (MgO) | 0.95 to 4.0 |
| Iron Oxides ($Fe_2O_3$) | 1.42 to 2.9 |
| Sodium Oxide ($Na_2O$) | 0.08 to 0.9 |
| Potassium Oxide ($K_2O$) | 0.51 to 6.0 |
| Sulfur Dioxide ($SO_2$) | 5.6 |

Generally coal which is burned in a cyclone-like furnace is pulverized to a size consist of $\frac{1}{8}$ inch × 0 mesh. The coarse particles of coal, i.e. those about $\frac{1}{8}$ inch in size, may not be completely burned. The unburned particles become entrapped in the molten slag formed in the furnace. The carbonaceous particles can react with iron oxides in the slag to reduce the oxides to metallic iron. Under these conditions metallic iron in the slag has resulted in fine metallic shot in the slag. The presence of the metallic shot can lead to a formation of rust or iron oxides in the mineral wool and products produced from mineral wool. Also, the metallic iron causes abrasion of the fiberizing equipment, leading to early failure of parts of the equipment which must be replaced. Slag with metallic iron present is to be avoided whenever possible as a material for fiberizing into mineral wool.

It is therefore imperative that any iron oxides in the raw materials are not reduced to metallic iron. By using waste materials as described herein the formation of metallic iron is reduced to a minimum, if not completely eliminated. When the fine particulate materials as described herein are fed into the cyclone-like furnace, the combustible particles are substantially instantaneously burned. Hence, there are essentially no carbonaceous particles available to reduce any iron oxides. The heat generated by burning the combustibles is sufficient to melt the inorganic non-combustibles and the fluxstone which then react while in the molten state to form a molten slag of the desired composition substantially free of any metallic iron.

As noted above, the slag temperature in the furnace should be maintained within a range suitable for fiberization. If the slag temperature is too high it can be adjusted by adding a quantity of reverts with the mixture of waste coal and waste lime. The reverts generally have a composition which is within the ranges shown below:

| Component | Weight Percent |
|---|---|
| Silica ($SiO_2$) | 35-45 |
| Alumina ($Al_2O_3$) | 17-25 |
| Lime (CaO) | 20-25 |
| Magnesium Oxide (MgO) | .5-2 |
| Iron Oxides ($Fe_2O_3$) | 5-20 |

All the particles of reverts added to the furnace should have a size of $-100$ mesh and about 60 to 90 weight percent of the particles should be $-325$ mesh.

It has been found that the ratio of particulate materials charged into the furnace should be about 4 to 7 parts of waste coal to one part of waste lime and dependent upon the slag temperature, between about 1 to 4 parts of reverts may be fed to the furnace.

The mineral wool produced by the process of the invention is comprised of between about 50 to 70 weight percent silica plus alumina, about 20 to 40 weight percent lime plus magnesia and about 2 to 10 weight percent iron oxides. The silica to alumina ratio is between about 3 to 1 and 1.5 to 1. The mineral wool is characterized by good physical properties and resistance to hydration during service when compared to slag wools made from conventionally processed slags. It is preferred that the silica plus alumina content be between about 60 and 70 weight percent and the lime content about 22 to 30 weight percent; the magnesia content about 1 to 2 weight percent; and the iron oxides content about 5 to 10 weight percent.

The mineral wool of the invention has fibers which have a diameter between 3 and 12 microns. The specific gravity is between 2.5 to 2.8. A typical composition of the mineral wool is shown below:

| Component | Weight Percent |
|---|---|
| Silica ($SiO_2$) + Alumina ($Al_2O_3$) | 60 to 70 |
| Lime (CaO) | 22 to 30 |
| Magnesia (MgO) | 1.2 |
| Iron Oxides ($Fe_2O_3$ + FeO) | 12.0 |

Turning now to the FIGURE, the apparatus is shown diagrammatically in the FIGURE of the invention and is comprised of apparatus 10 having a generally horizontal cylindrical combustion zone 11, closed by end plate 14, a collecting zone 12 and an igniter 13. The combustibles in the mixture are burned in the combustion zone 11 and the non-combustibles and fluxstone react and form a molten slag which collects on the walls (not shown) of the zone 11 and flows down the walls and is collected in the discharge end 15 of the bottom of the collecting zone 12. The molten slag is discharged through port 16 as shown. The molten slag S flows down runner 17 and is fed directly to an apparatus A whereby the slag is substantially instantaneously cooled, elongated and solidified to form mineral wool fibers as described previously. A portion of the slag is formed into generally spherical solid particles called reverts.

The exhaust gases formed during combustion pass from the collecting zone 12 to the heat exchanger 19 by way of exhaust passage 18. Cold combustion air is blown by compressed air blower 20 through heat exchanger 19 where it is heated to between about 430 C. and 650 C. by the hot exhaust gases. The exhaust gases are cooled to about 600 C. in heat exchanger 19 and are passed to scrubbers or dust collectors (not shown) prior to being exhausted to the atmosphere; this waste heat is suitable for drying coal and lime wastes or it can be used for other process or building heating purposes. The preheated combustion air is recycled to the furnace 10 through passage 21. The particulate materials are fed into the preheated combustion air passage from feed hoppers 22 and 23 and are mixed and blown into the combustion zone 11 with the preheated combustion air. Reverts in bin 24 are added as needed. The velocity of the preheated combustion air and particulate materials may be between about 30 and 60 meters per second. It is important that the temperature and velocity of the preheated gases be such that the combustibles fed into the combustion zone 11 will be burned substantially instantaneously and the particulate non-combustibles and fluxstone directed against the walls of the combustion zone 11 and collecting zone 12 to maintain accurate control of the process.

While we have shown and described the cyclone-like furnace as being positioned in a generally horizontal plane, it is within the scope of this invention to include a cyclone-like furnace which is positioned vertically. Of course, such vertical position will require repositioning of the ancillary parts, for example, the feed port, the discharge port and piping arrangement of the furnace. It is within the scope of this invention to include such modifications.

In a specific example of the invention, a charge comprised of five parts of particulate waste coal and one part of particulate waste lime was fed continuously into a horizontal cyclone-like furnace. The compositions of the waste coal, waste lime and total charge are shown below:

| Ingredient | Waste Coal Wt. Percent | Waste Coal Kgs. per 100 Kgs. Refuse* | Waste Lime Wt. Percent | Waste Lime Kgs. per 100 Kgs. Refuse** | Weight Percent | Total Wt. Kilograms |
|---|---|---|---|---|---|---|
| $SiO_2$ | 20.8 | 50.5 | 2.3 | 0.7 | 42.7 | 51.2 |
| $Al_2O_3$ | 8.8 | 21.4 | 1.6 | 0.5 | 18.3 | 21.9 |
| $Fe_2O_3$ | 4.6 | 11.2 | 0.6 | 0.2 | 10.0 | 11.4 |
| CaO | 2.9 | 7.0 | 60.8 | 18.2 | 21.0 | 25.2 |
| MgO | 0.4 | 1.0 | 0.5 | 0.2 | 1.0 | 1.2 |
| FeO | 1.8 | 4.4 | — | — | 3.7 | 4.4 |
| $Na_2O$ | 0.9 | 2.2 | — | — | 1.8 | 2.2 |

-continued

| Ingredient | Waste Coal Wt. Percent | Waste Coal Kgs. per 100 Kgs. Refuse* | Waste Lime Wt. Percent | Waste Lime Kgs. per 100 Kgs. Refuse** | Weight Percent | Total Wt. Kilograms |
| --- | --- | --- | --- | --- | --- | --- |
| $K_2O$ | 1.0 | 2.4 | — | — | 2.0 | 2.4 |

*Corrected for Loss on Ignition which was 59.5
**Addition rate waste lime = 0.3 kilograms, per kilogram of ash All the particulate waste coal passed through a 200 mesh sieve and 70 weight percent passed through a 325 mesh sieve. All the particulate waste lime passed through a 200 mesh sieve and 30 weight percent passed through a 325 mesh sieve.

From a cold furnace condition, natural gas or oil is burned for one to two hours to gradually heat the furnace and recuperator to about 1300 C. Then combustion of the particulate waste coal can be initiated by the igniter in the furnace with combustion air at a temperature of 500 C. and a velocity of 30 meters per second. The particulate waste coal-waste lime mixture was blown into the furnace with the preheated air. About 10 kilograms per minute of the mixture were burned and melted together with about 2 kilograms per minute of reverts to maintain slag temperature in the range of 1500 to 1540 C. A molten slag was formed on the walls of the combustion zone and was collected in the collecting chamber. About 1 kilogram of molten slag was formed for every 1.5 kilograms of particulate mixture burned. The molten slag was tapped from the furnace and was fiberized by conventional means into mineral fibers having a diameter of between 3 and 12 microns. The mineral wool produced by the process had a chemical composition shown below:

| Component | Weight Percent |
| --- | --- |
| Silica ($SiO_2$) | 42.7 |
| Alumina ($Al_2O_3$) | 18.2 |
| Lime (CaO) | 21.3 |
| Magnesia (MgO) | 1.0 |
| Iron Oxides ($Fe_2O_3$ + FeO) | 13.2 |

The mineral wool fibers had an average diameter of 5 microns and a length of 10 centimeters. The process produced about 4 kilograms per minute of reverts having a chemical composition shown below:

| Component | Weight Percent |
| --- | --- |
| Silica ($SiO_2$) | 42.7 |
| Alumina ($Al_2O_3$) | 18.2 |
| Lime (CaO) | 21.3 |
| Magnesia (MgO) | 1.0 |
| Iron Oxides | 13.2 |

The reverts were stored for future use in the process. In these specifications, wherever percentages are shown such percentages are on a weight basis unless otherwise noted. All references to mesh sizes are U.S.S. Sieve Sizes.

We claim:

1. A process for producing mineral wool wherein a molten slag substantially free of metallic iron and suitable for fiberizing into mineral wool is formed in a cyclone-type furnace having a combustion zone, a collecting zone and an exhaust gases-combustion air heat exchanger, the process comprising:
    (a) feeding
    (i) a first particulate material containing organic combustibles and inorganic non-combustibles and characterized by a composition comprised of between: about 49-62 weight percent silica, about 21-27 weight percent alumina, about 1.0-3.0 weight percent lime, about 0.5-3.0 weight percent magnesia, about 2.5-19 weight percent iron oxides, about 0.3-4.0 weight percent sulfur, a size consist of 100 weight percent −200 mesh and at least about 70 weight percent −325 mesh, and a heating value of about 10 mega J per kilogram of molten slag produced, and
    (ii) a second particulate material containing fluxstone and characterized by a size consist of 100 weight percent −200 mesh and at least about 30 weight percent −325 mesh, and
    (iii) preheated air into the combustion zone of the cyclone-like furnace,
    (b) substantially instantaneously burning the organic combustibles and melting and reacting the inorganic non-combustibles and fluxstone to form a molten slag on the walls of the collecting zone,
    (c) collecting the molten slag in the bottom of the collecting zone,
    (d) passing waste combustion gases formed in the furnace through a heat exchanger to thereby heat incoming combustion air used in the process,
    (e) discharging the molten slag from the collecting zone, and
    (f) fiberizing the molten slag to form mineral wool.

2. The process of claim 1 in which the mixture of particulate materials fed into the furnace in step (a) is comprised of between about 4 and 7 parts of waste coal to one part of waste lime.

3. The process of claim 1 in which the preheated combustion air fed into the furnace in step (a) is at a temperature between about 430 C. and 650 C. and a velocity of between about 30 meters per second and 60 meters per second.

4. The process of claim 1 in which the temperature of combustion air fed into the furnace is between about 500 and 600 C.

5. The process of claim 2 in which the particulate materials fed into the furnace in step (a) include 1 to 4 parts of reverts.

6. The process of claim 1 in which the first particulate material contains a quantity of particulate virgin coal fines having a size consist of 100 weight percent −200 mesh and at least 70 weight percent are −325 mesh to thereby increase the heating value of the particulate material to at least about 10 mega J per kilogram of slag formed in the process.

7. The process of claim 1 in which the liquid slag formed in step (b) has a viscosity of between about 20 and 200 poises and a chemical composition comprised of between about 50 and 70 weight percent silica plus alumina, about 20 and 35 weight percent lime plus magnesia and about 5 and 15 weight percent iron oxides.

8. The process of claim 1 in which the second particulate material is waste lime fines which typically has a chemical composition comprised of:

| Component | Weight Percent |
| --- | --- |
| Silica ($SiO_2$) | 4.0-17.1 |
| Alumina ($Al_2O_3$) | 1.5-8.8 |
| Calcium Oxide (CaO) | 39.4-67.3 |

-continued

| Component | Weight Percent |
|---|---|
| Magnesium Oxide (MgO) | 0.95–4.0 |
| Iron Oxides (Fe$_2$O$_3$) | 1.42–2.9 |
| Potassium Oxide (K$_2$O) | 0.08–0.9 |
| Sodium Oxide (Na$_2$O) | 0.51–6.0 |
| Sulfur Dioxide (SO$_2$) | 5.6 |

9. A mineral wool made by the process of claim 1 suitable for use as insulation against heat and cold and sound absorption, comprised of between about 50 and 70 weight percent silica plus alumina, about 20 and 35 weight percent lime and magnesia, and about 5 and 15 weight percent iron oxide.

10. A mineral wool made by the process of claim 1 suitable for use as insulation against heat and cold and sound absorption, comprised of between about 60 and 70 weight percent silica plus alumina, 20 and 30 weight percent lime plus magnesia, and 5 and 10 weight percent iron oxides.

* * * * *